United States Patent
Bruns

(10) Patent No.: US 11,371,602 B1
(45) Date of Patent: Jun. 28, 2022

(54) FAULT DETECTION IN AN ALL-WHEEL-DRIVE SYSTEM

(71) Applicant: FORD GLOBAL TECHNOLOGIES, LLC, Dearborn, MI (US)

(72) Inventor: Richard David Bruns, Milford, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/158,569

(22) Filed: Jan. 26, 2021

(51) Int. Cl.
| | | |
|---|---|---|
| F16H 61/12 | (2010.01) | |
| F16H 59/44 | (2006.01) | |
| F16H 59/46 | (2006.01) | |
| B60W 50/02 | (2012.01) | |
| B60W 10/119 | (2012.01) | |
| B60W 50/14 | (2020.01) | |
| F16H 59/14 | (2006.01) | |
| F16H 59/50 | (2006.01) | |

(52) U.S. Cl.
CPC ............ *F16H 59/44* (2013.01); *F16H 59/46* (2013.01); *F16H 61/12* (2013.01); *B60W 10/119* (2013.01); *B60W 50/0205* (2013.01); *B60W 50/14* (2013.01); *F16H 2059/147* (2013.01); *F16H 2059/506* (2013.01); *F16H 2061/1212* (2013.01); *F16H 2061/1216* (2013.01)

(58) Field of Classification Search
CPC .......... F16H 59/44; F16H 59/46; F16H 61/12; F16H 2059/506; F16H 2061/1212; F16H 2061/1216; B60W 50/0205; B60W 50/14; B60W 10/119

USPC ....................................................... 701/89, 90
See application file for complete search history.

(56) References Cited

U.S. PATENT DOCUMENTS

| | | | | |
|---|---|---|---|---|
| 5,407,024 | A * | 4/1995 | Watson | B60K 17/344 180/248 |
| 5,448,478 | A * | 9/1995 | Eto | B60K 23/0808 180/197 |
| 7,630,812 | B2 | 12/2009 | Jiang et al. | |
| 10,870,423 | B1 * | 12/2020 | Orzechowski | B60K 23/0808 |
| 2009/0227421 | A1 * | 9/2009 | Saito | B60K 17/35 477/175 |
| 2014/0297141 | A1 * | 10/2014 | Nihanda | B60K 23/0808 701/58 |
| 2016/0347171 | A1 * | 12/2016 | Ogawa | B60K 17/344 |
| 2018/0222481 | A1 * | 8/2018 | Okada | F16D 48/066 |
| 2019/0143978 | A1 | 5/2019 | Pandit et al. | |

FOREIGN PATENT DOCUMENTS

WO      2011128567 A1    10/2011

* cited by examiner

*Primary Examiner* — Roger L Pang
(74) *Attorney, Agent, or Firm* — Vincent Mastrogiacomo; Brooks Kushman P.C.

(57) ABSTRACT

An all-wheel-drive vehicle includes a primary drive axle, a secondary drive axle, and an all-wheel-drive powertrain configured to selectively power the primary and secondary axles. The powertrain includes a powerplant and a clutch that couples the powerplant to the secondary axle when engaged and that decouples the powerplant from the secondary axle when disengaged. A controller is programmed to disengage the clutch to disable all-wheel drive and propel the vehicle solely with the primary drive axle based on repeated occurrence of power output of the powertrain being less than a value.

20 Claims, 4 Drawing Sheets

US 11,371,602 B1

FAULT DETECTION IN AN ALL-WHEEL-DRIVE SYSTEM

TECHNICAL FIELD

This disclosure relates to vehicle all-wheel-drive systems and more specifically to detecting faults in the all-wheel-drive system.

BACKGROUND

A motor vehicle includes a powerplant, e.g., an engine, for providing propulsion. Power produced by the engine can be routed to the wheels in a variety of different configurations such as rear-wheel drive, front-wheel drive, four-wheel drive, or all-wheel drive (AWD). Front-wheel drive and rear-wheel drive vehicles include a drive axle that receives powertrain torque and a non-driven axle that is not powered. In contrast, four-wheel-drive and all-wheel-drive are capable of providing power to both axles. These vehicles typically have a power bias resulting in a primary drive axle and a secondary drive axle.

SUMMARY

According to one embodiment, an all-wheel-drive vehicle includes a primary drive axle, a secondary drive axle, and an all-wheel-drive powertrain configured to selectively power the primary and secondary axles. The powertrain includes a powerplant and a clutch that couples the powerplant to the secondary axle when engaged and that decouples the powerplant from the secondary axle when disengaged. A controller is programmed to disengage the clutch to disable all-wheel drive and propel the vehicle solely with the primary drive axle based on repeated occurrence of power output of the powertrain being less than a value.

According to another embodiment, an all-wheel-drive vehicle includes a powerplant, a clutch, a primary axle operably coupled to the powerplant, and a secondary axle coupled to the powerplant when the clutch is engaged and decoupled from the powerplant when the clutch is disengaged. A controller is programmed to, in response to a summation of a first product of capacity of the clutch and slip of the clutch minus a second product of torque of the powerplant and vehicle speed exceeding a threshold, disengage the clutch to disable all-wheel drive and propel the vehicle solely with the primary drive axle.

According to yet another embodiment, a method of detecting mechanical faults in an all-wheel-drive system includes engaging a clutch of an all-wheel-drive system to power primary and secondary axles of a vehicle. The method further includes, in response to occurrence of a predetermined number of instances of a powertrain power being less than a value, disengaging the clutch to disable all-wheel drive and propel the vehicle solely with the primary drive axle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
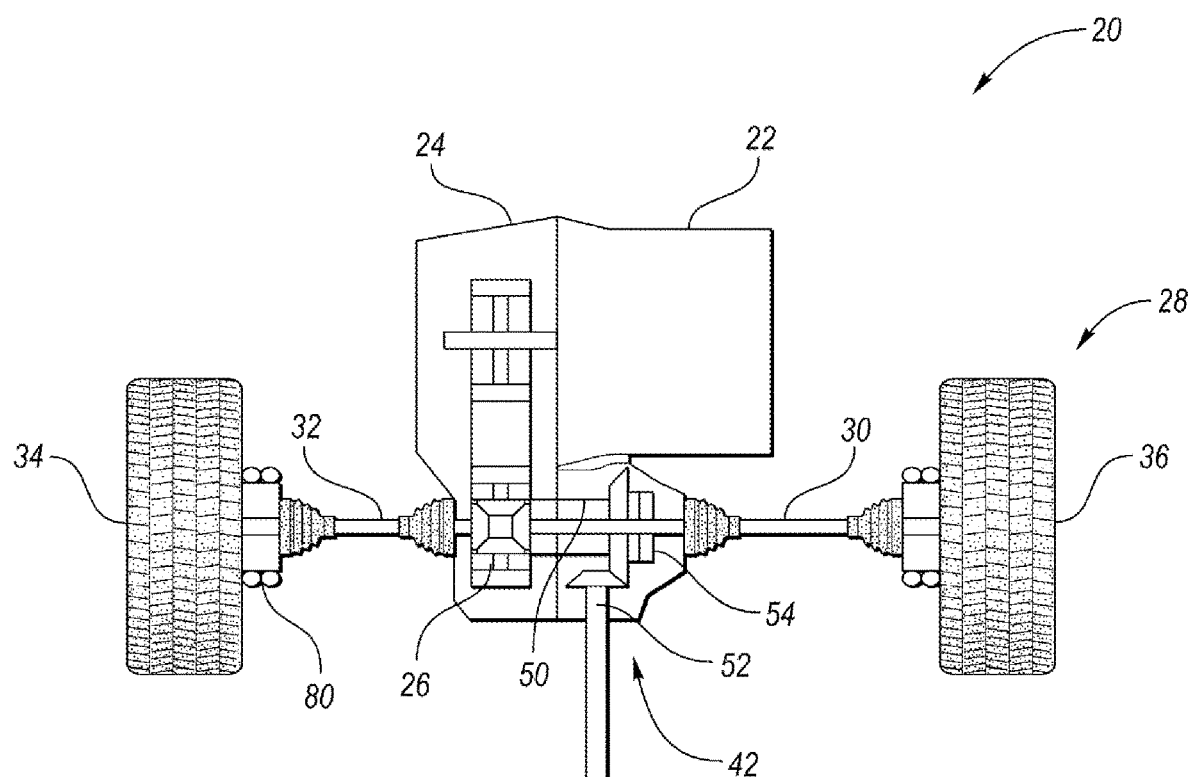
FIG. 1 is a schematic diagram of a vehicle according to one or more embodiments.
Figure 1:
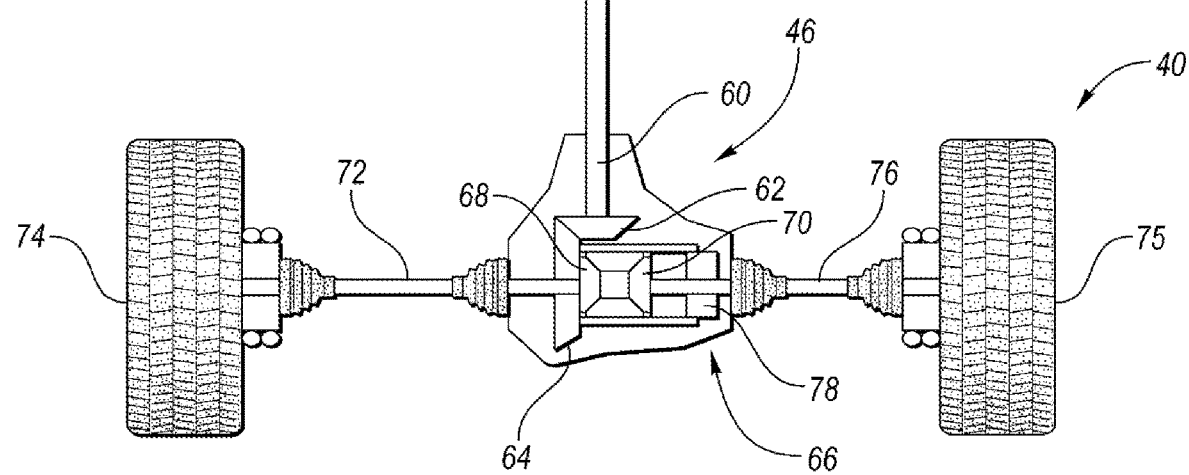
Figure 2:
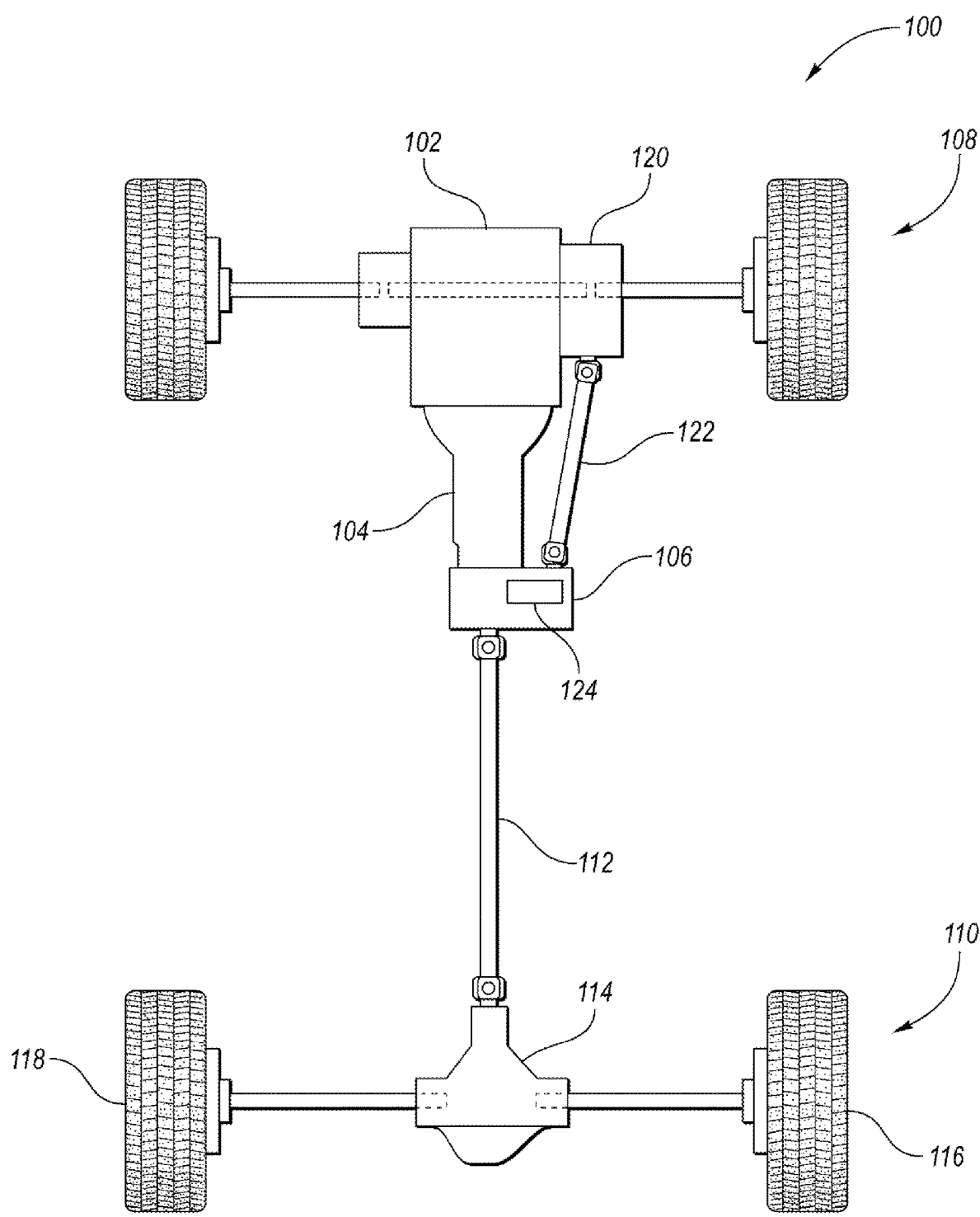
FIG. 2 is a schematic diagram of a vehicle according to one or more alternative embodiments.

Referring to FIG. 1, an all-wheel-drive vehicle 20 includes a powerplant 22 such as an internal-combustion engine or an electric machine. In the illustrated embodiment, the powerplant 22 is an internal combustion engine configured to operate on gasoline, diesel or other fuel. The engine 22 may be mounted transversely in the vehicle 20 (as shown) or longitudinally (as shown in FIG. 2). A transmission 24 (e.g., a transaxle) is coupled to the engine 22. The transmission 24 may be a multi-speed transmission such as an automatic or manual transmission. The transmission 24 includes an output that is coupled to a differential 26 associated with the front axle 28. The differential 26 receives power from the transmission and outputs that power to the halfshafts 30, 32 of the front axle 28. In the illustrated embodiment, the vehicle 20 is biased to front-wheel drive and the front axle 28 is the primary axle. As the primary axle, the engine 22 and the front wheels 34, 36 are driveably connected whenever the transmission 24 is in gear, e.g., DRIVE. Two components are driveably connected if they are connected by a power flow path that constrains their rotational speeds to be directly proportional.

The rear axle 40 is the secondary axle and selectively receives power from the engine 22 as needed. For example, the secondary axle 40 may receive power from the engine 22 when traction of the front wheels 34, 36 is limited, when the engine 22 is producing high power, or other conditions known in the art. The rear axle 40 is operably coupled to the engine 22 by a power-transfer unit (PTU) 42, a driveshaft 44, and a rear-drive unit (RDU) 46. The PTU 42 includes an input 50, e.g., a shaft or case, that is fixedly coupled to the differential 26 and an output 52 that is fixedly coupled to the driveshaft 44. A group of rotating elements are fixedly coupled to one another if they are constrained to rotate as a unit in all operating conditions. Rotating elements can be fixedly coupled by spline connections, welding, press fitting, machining from a common solid, damper connections, or other means. Slight variations in rotational displacement between fixedly coupled elements can occur such as displacement due to lash or shaft compliance and damper oscillations.

A clutch 54 selectively couples the input 50 and the output 52. Two rotating elements are selectively coupled when the elements are constrained to rotate together in a first condition and are free to rotate at unrelated speeds in one or more other conditions. When the clutch is engaged, the driveshaft 44 receives power. When the clutch is disengaged, the driveshaft 44 does not receive power. Generally, the clutch 54 is engaged when the vehicle is in an all-wheel-drive mode and is disengaged when the vehicle is in a front-wheel drive mode.

The RDU 46 includes an input 60 fixedly coupled to the driveshaft 44. The input 60 may include a shaft that supports a pinion gear 62. The pinion 62 may mesh with a bevel gear 64 of a differential 66. The differential 66 may be an open differential. The differential 66 includes a carrier that supports the bevel gear 64, a pair of spider gears, and a pair of side gears 68, 70. The side gear 68 may be fixedly coupled to the halfshaft 72 to provide power to the driver side rear wheel 74. In contrast, the side gear 70 is selectively coupled to the halfshaft 76 by a clutch 78. When the clutch 78 is engaged, the halfshaft 76 is coupled to the side gear 70, and when the clutch 78 is disengaged, the halfshaft 76 is decoupled from the side gear 70. Used herein "engaged" includes both full engagement of the clutch (locked) and partially engagement of the clutch (slipping). Used herein "disengaged" refers to an open clutch in which torque is not transferred across the clutch.

The clutch 78 may be a multi-plate wet clutch that includes a clutch pack. The clutch pack includes a first set of friction plates rotationally fixed to the side gear 70 and a second set of friction disks rotationally fixed to the halfshaft 76. An actuator of the clutch 78 is configured to compress the plates and disks together to create clutch capacity, i.e., torque transfer through the clutch. The actuator may be an electronic actuator, such as an electric motor, that is configured to compress the clutch pack to engage the clutch. In one or more example embodiments, an electric motor drives a ball-ramp mechanism that increases and decreases the force applied to the clutch pack to control clutch capacity. Of course other types of mechanisms may be used in other embodiments.

The vehicle 20 is switched between all-wheel propulsion and front-wheel propulsion by engaging and disengaging the clutch 78. When the clutch 78 is disengaged, power cannot flow from the input 60 to the wheels 74, 75 of the rear axle 40; thus, the vehicle is in front-wheel drive. When the clutch 78 is engaged, power flows to the rear axle and to propel the vehicle using both the front axle 28 and the rear axle 40, i.e., all-wheel drive. The clutch 78 may be designed to slip throughout all-wheel drive operation to modulate the torque split between the front and rear axles based on sensed conditions.

The vehicle 20 may include wheel sensors 80 such as individual wheel sensors 80 located at each of the wheels. The wheel sensors 80 are configured to output a signal indicative of an angular velocity of their associated wheel. The wheel sensors 80 are in electric communication with the controller 82. The controller 82 is configured to receive the signals from the wheel sensors 80 and determine a speed for each of the wheels. Using the wheel speeds, the controller can determine the relative speeds between each of the wheels, between each of the axles, between wheels of a same axle, and the like to determine traction conditions (among other things) that are used to control the all-wheel-drive system and other systems of the vehicle. For example, the controller 82 may be programmed to determine the average wheel speed for the front axle based on the speed sensors 80 associated with the front wheels 34, 36, and to determine the average wheel speed for the rear axle 40 based on the speed sensors 80 of the rear wheel 74, 75. The controller 82 may be further programmed to compare the average wheel speeds of the front and rear axles 28 and 40 to determine the relative wheel slip between these axles.

The controller 82, such as a powertrain control unit (PCU), an engine control module (ECM), and an all-wheel drive controller, while illustrated as one controller may be part of a larger control system and may be controlled by various other controllers throughout the vehicle 20, such as a vehicle system controller (VSC). It should therefore be understood that the controller 82 and one or more other controllers can collectively be referred to as a "controller" that controls various actuators in response to signals from various sensors to control functions such as starting/stopping of the engine, scheduling transmission shifts, operating the clutches of the all-wheel drive-system etc. Controller 82 may include a one or more microprocessors or central processing units (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 82 may communicate signals to and/or from the engine 22, the transmission 24, the PTU 42, the RDU 46, the wheel sensors 80, and others. Although not explicitly illustrated, those of ordinary skill in the art will recognize various functions or components that may be controlled by controller 82 within each of the subsystems identified above. Representative examples of parameters, systems, and/or components that may be directly or indirectly actuated using control logic executed by the controller.

The controller is configured to estimate the torque produced by the powerplant, e.g., the engine. For internal-combustion engines, the controller may determine the torque produced based on the amount of air and fuel entering the engine. The powertrain torque estimate at the wheels may be calculated by measuring the air and fuel being consumed by the engine and accounting for losses from friction, accessories, fluid pumping, and other ancillary power consumers to determine the net torque available at the wheels.

The controllers 82 is also configured to estimate the clutch capacity of the one or more clutches associated with the all-wheel-drive system. For example, the controller may determine the clutch capacity based on the amount of pressure applied by the clutch actuator. Rather than directly measuring the pressure, the controller may determine the pressure applied based on the position of the clutch actuator or the electric current being drawn by the actuator, for example. The controller may include one or more lookup tables that correlate actuator position or current to clutch torque capacity or pressure. In one example embodiment, the lookup table outputs a clutch capacity based on the actuator position, the clutch slip, and the clutch temperature. Of course, other and different factors may be considered based on the specific design of the clutch and actuator.

FIG. 2 illustrates another all-wheel-drive vehicle 100, that unlike the vehicle 20, has a longitudinally mounted engine 102 and is rear-wheel biased. A transmission 104 is coupled to the engine 102. The output of the transmission 104 is connected to a transfer case 106 that selectively powers the secondary axle (front axle) 108. The transfer case 106 is configured to always route power to the primary (rear) axle 110 via a rear driveshaft 112. The driveshaft 112 routes power to a rear differential that splits the power between the left and right rear wheels 116 and 118. The front axle 108 includes a front differential 120 that is driveably connected to the transfer case by a front driveshaft 122. Within the transfer case 106 are one or more clutches 124 that selectively couple the front driveshaft 122 to the powertrain. For example, when the vehicle 100 is in a two-wheel drive, the one or more clutches are disengaged to isolate the front axle 108 and propel the vehicle solely with the rear wheels 116, 118. When the vehicle 100 is in four-wheel drive or all-wheel drive, the one or more clutches 124 are engaged to route at least some of the power produced by the engine 102 to the front axle 108.

In both of the above-described illustrated embodiments, as well as other non-illustrated embodiments, one or more clutches of the all-wheel-drive system are controlled to increase and decrease the amount of power routed to the secondary axle. The clutches are controlled by increasing and decreasing the capacity of these clutches, i.e., the torque passing from one side of the clutch to other, such as by increasing and decreasing the pressure applied to a clutch pack for example.

An all-wheel-drive system, like any mechanical system, may experience faults, such as mechanical faults (e.g., warn, broken, or missing components) and electrical faults (e.g., signal loss or errors, open circuits, or software issues), that affect the functionality of the all-wheel-drive system. For example, a mechanical fault may result in a decreased ability to transfer torque to the secondary axle. If the faults are minor, the customer may not appreciate that the poor performance is attributed to a fault condition rather than an infer product. As will be described in detail below, this disclosure sets forth control systems and methods for detecting faults in the all-wheel-drive system, alerting the customer that the all-wheel-drive system requires service, and/or disabling the all-wheel drive system. These control systems and methods may be embodied in the above-described vehicle architectures or any other all-wheel-drive system.

The fault may be detected by comparing the power generated by the powertrain to the power absorbed by the all-wheel-drive clutch, e.g., clutch 78 or 124. If powertrain power is less than the power absorbed by the clutch, this is indicative of a fault in the all-wheel-drive system because it is impossible for the clutch to absorb more power than the powertrain is producing.

Figure 3:
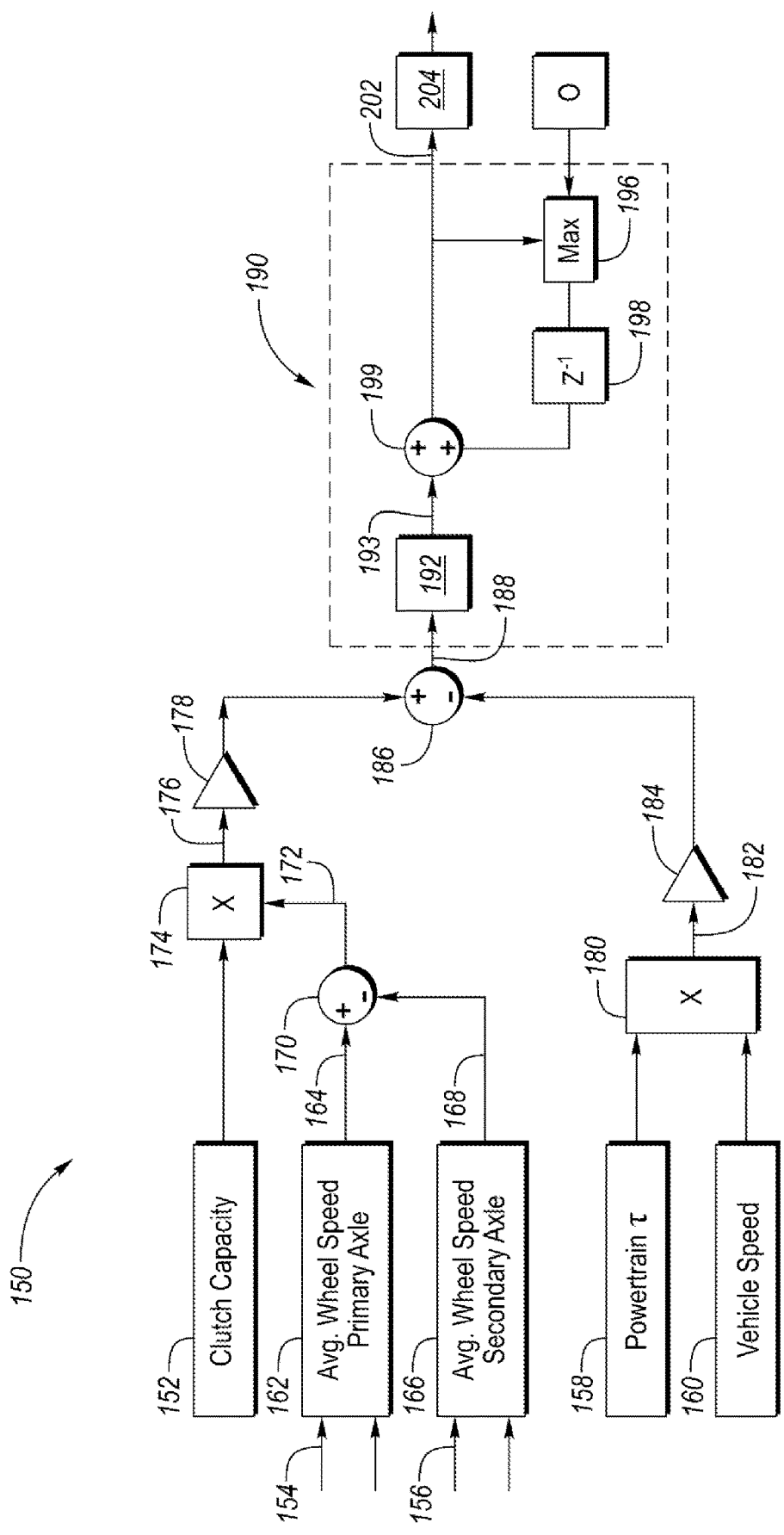
FIG. 3 is a control diagram of a control system for detecting faults in an all-wheel-drive system.

FIG. 3 illustrates an example control diagram 150 for determining a fault in the all-wheel-drive system based on a comparison of powertrain power and power absorbed by the AWD clutch. The controls receive several inputs such as the clutch capacity 152, wheel speeds signals of the primary axle 154, wheel speed signals of the secondary axle 156, the powertrain torque 158, and a measured axle speed 160, which is an average wheel speed of the primary axle. The vehicle may include a speed sensor in the transmission or other location that outputs a measured vehicle speed to the controller. The wheel speed signals associated with the primary axle are received at box 162 where the controller calculates an average wheel speed for the primary axle 164. The wheel speed signals associated with secondary axle are received at box 166 where the controller calculates an average wheel speed for the secondary axle 168. The average wheel speeds 164 and 166 are fed to a summing box 170 where the controller determines speed difference between the primary and secondary axles. The speed differential between the axles should be near zero when the clutch is locked; therefore, the speed differential may be used to infer the slip across the clutch rather than attempting to measure the input and output of the clutch, which is difficult. As such, the wheel speed differential may be referred to as the clutch slip 172. The clutch capacity 152 is multiplied by the clutch slip 172 at multiplication box 174 to determine the power absorbed by the clutch 176. The power absorbed by the clutch 176 may be modified by a gain 178 to reduce the magnitude. The ratio of the gain is a calibrated value that adjusts the sensitivity of the fault detection.

The powertrain torque 158 may be based on the torque produced by the powerplant, e.g., engine torque, and losses of the drivetrain. The powertrain torque 158 may be the estimated torque at the wheels of the vehicle. The powertrain torque 158 is multiplied by the axle speed 160 at multiplication block 180 to determine the powertrain power 182. The powertrain power 182 may be the estimated power at the wheels of the vehicle. The powertrain power 182 may be modified by a gain 184 to reduce the magnitude of the power and is calibratable to adjust the sensitivity of the system.

The power absorbed by the clutch 176 and the powertrain power 182 are feed to subtraction block 186. At block 186, the controller subtracts the powertrain power 182 from the power absorbed by the clutch 176 to determine the difference 188. (This may be switched in other embodiments.) The difference 188 is fed to an error counter 190 configured to determine if the powertrain power is less than the power absorbed, which is indicative of a fault in the all-wheel drive system. In one or more embodiments, the error counter 190 may be a leaky bucket. To insulate from instantaneous errors, the error counter 190 only flags a fault when the error persists for multiple iterations, e.g., when the total error contained within the leaky bucket exceeds a threshold. That is, the controller is programmed to, in response to occurrence of a predetermined number of instances of a power output of the powertrain being less than a product of capacity of the clutch and slip of the clutch, flag an error. The number of predetermined instances may be a calibrated value, which through testing, indicates that the clutch is transferring well below its expected capacity of several seconds.

The error counter 190, e.g., a leaky bucket, may include a leak 192 that is used to reduce the magnitude of the difference 188. For example, a predefined constant may be subtracted from the difference 188. The predefined constant is a calibrated value and may be used to increase or decrease the sensitivity of the system. The output 193 of box 192 is then fed to a feedback loop that integrates the output of box 192. The feedback loop includes a saturation block 196 that outputs a value between a minimum and a maximum, which may be between zero and an upper limit. The output of the saturation block 196 is held for the next loop at delay block 198. The output of delay box 198 is added to the modified difference 193 at summation block 199. The power difference over time 202 is output from the error counter 190 and is received by block 204. At block 204, the power difference 202 is compared to a threshold. If the power difference is greater than the threshold, a fault/error is detected.

Once an error is detected in the all-wheel-drive system based on the controls 150, the vehicle may take remedial action, such as disabling the all-wheel-drive system as well as providing visual, audio, or other indicators to the driver. For example, the vehicle instrumentation system, including video displays, instrument panel indicators, lamps, speakers, and the like, is configured to issue a warning message to the driver that the all-wheel-drive system has a fault present.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 4:
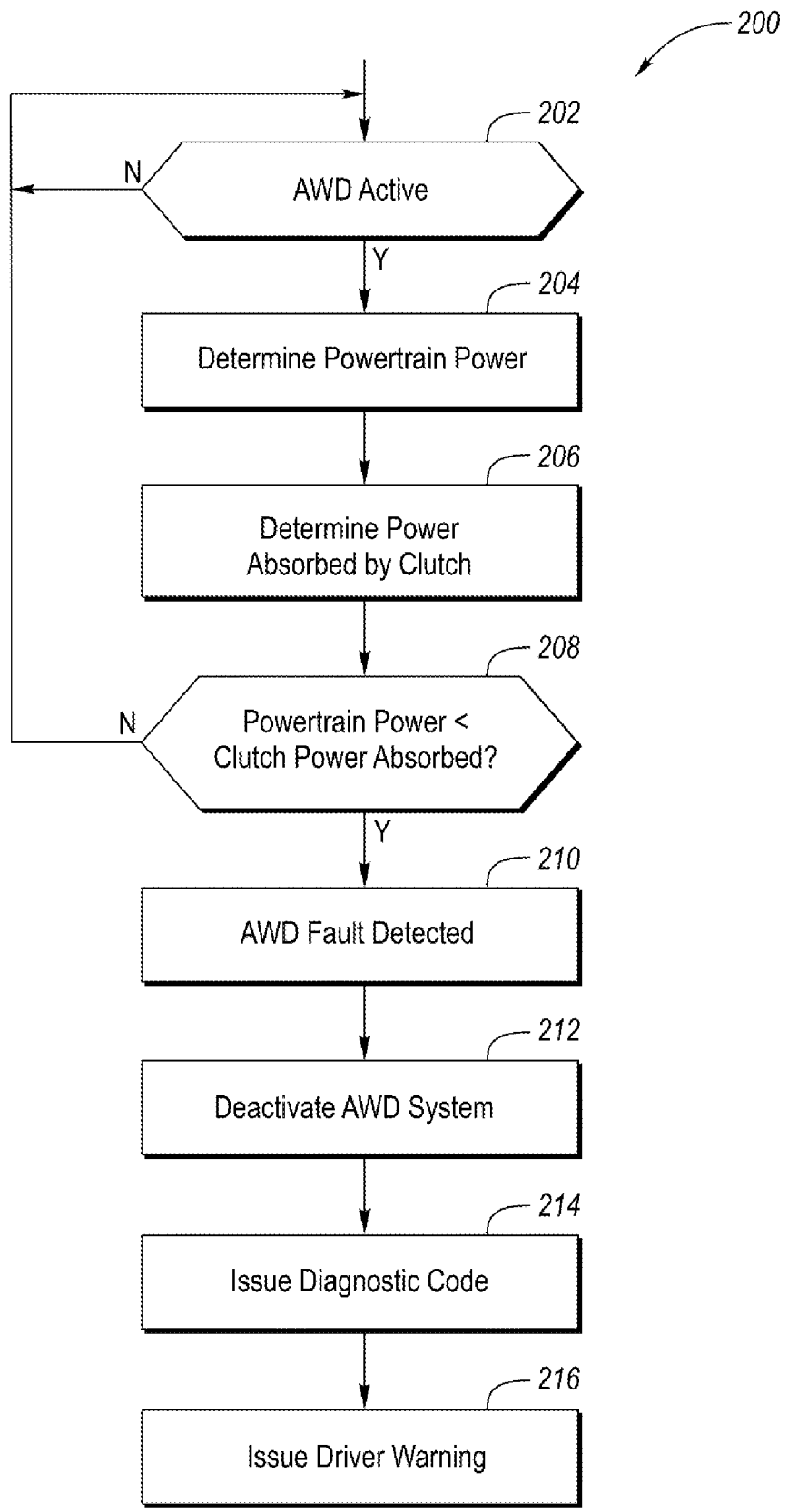
FIG. 4 is a flow chart of an algorithm for fault detection and controls of an all-wheel-drive system.

FIG. 4 is a flowchart 200 of an algorithm for detecting faults in all-wheel-drive systems and taking remedial action. Control begins at operation 200 to where the controller determines if the all-wheel-drive system is active. The controls may include additional checks at operation 204, such as: the accelerator pedal position exceeds a threshold, clutches are in torque mode, the PTU is connected, vehicle speed is within a minimum/maximum threshold window, the spare tire is not being used, the wheel speed sensors are functioning correctly, etc. If yes, control passes to operation 204 and the controller determines the powertrain power. In operation 206, the controller determines the power absorbed by the clutch. The powertrain power and the power absorbed may be calculated as shown above in FIG. 3.

At operation 208, the controller determines if the powertrain power generated is less than the clutch power absorbed. If yes, this indicates a fault in the all-wheel-drive system as it is impossible for the clutch to absorb more power than that being produced by the powertrain. As stated above, the controller will track the occurrences of the powertrain power being less than the clutch power absorbed and if this number of occurrences exceeds a threshold within a sampling period, then a fault is detected in the all-wheel-drive system at operation 210.

The controller may take one or more forms of remedial action once a fault is detected. For example, the controller may deactivate the all-wheel-drive system at operation 212. The all-wheel-drive system may be deactivated by commanding the one or more clutches associated with the all-wheel-drive system to disengage. As shown in the above-described vehicles of FIGS. 1 and 2, disengaging the clutch decouples the secondary axle from the powertrain and places the vehicle in either front-wheel drive or rear-wheel drive depending upon the architecture. The controller may be programmed to disable the all-wheel-drive system for the remainder of that key cycle and may reattempt to operate the all-wheel-drive system in a subsequent key cycle until a fault is detected. Alternatively, the all-wheel-drive system may remain deactivated until service is performed.

The controller may also issue one or more of a diagnostic code(s) 214 or a driver warning(s) 216. The diagnostic code issued at operation 214 may be stored in memory of the controller and readable by a service technician or other skilled person. The diagnostic code may include data that indicates a failure of the all-wheel-drive system. The driver warning issued at 216 may include a visual indicator displayed on the instrument panel, a video screen, or the like.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An all-wheel-drive vehicle comprising:
   a primary drive axle;
   a secondary drive axle;
   an all-wheel-drive powertrain configured to selectively power the primary and secondary axles, the powertrain including a powerplant and a clutch that couples the powerplant to the secondary axle when engaged and that decouples the powerplant from the secondary axle when disengaged; and
   a controller programmed to disengage the clutch to disable all-wheel drive and propel the vehicle solely with the primary drive axle based on repeated occurrence of power output of the powertrain being less than a value.

2. The all-wheel-drive vehicle of claim 1, wherein the value is a product of capacity of the clutch and slip of the clutch.

3. The all-wheel-drive vehicle of claim 2, wherein the power output is based on a product of vehicle speed and torque of the powerplant, and the clutch slip is based on a wheel speed differential between the primary and secondary axles.

4. The all-wheel-drive vehicle of claim 1, wherein the power output is based on a product of vehicle speed and torque of the powerplant.

5. The all-wheel-drive vehicle of claim 1, wherein the controller is further programmed to issue a diagnostic code indicative of a mechanical fault of the powertrain in response to the repeated occurrence of power output of the powertrain being less than the value.

6. The all-wheel-drive vehicle of claim 1, wherein the controller is further programmed to issue a driver warning indicative of a mechanical fault of the powertrain in response to the repeated occurrence of power output of the powertrain being less than the value.

7. The all-wheel-drive vehicle of claim 1, wherein the value is based on capacity of the clutch and slip of the clutch.

8. The all-wheel-drive vehicle of claim 1, wherein the clutch includes a clutch pack and an actuator configured to engage and disengage the clutch pack, wherein the capacity of the clutch is based on a position of the actuator.

9. The all-wheel-drive vehicle of claim 1, wherein the powerplant is an engine.

10. An all-wheel-drive vehicle comprising:
a powerplant;
a clutch;
a primary axle operably coupled to the powerplant;
a secondary axle coupled to the powerplant when the clutch is engaged and decoupled from the powerplant when the clutch is disengaged; and
a controller programmed to, in response to a summation of a first product of capacity of the clutch and slip of the clutch minus a second product of torque of the powerplant and vehicle speed exceeding a threshold, disengage the clutch to disable all-wheel drive and propel the vehicle solely with the primary drive axle.

11. The all-wheel-drive vehicle of claim 10, wherein the controller is further programmed to issue an all-wheel-drive diagnostic code in response to the second product being less than the first product.

12. The all-wheel-drive vehicle of claim 10, wherein the controller is further programmed to issue a driver warning indicative of a mechanical fault of an all-wheel-drive system in response to the second product being less than the first product.

13. The all-wheel-drive vehicle of claim 10, wherein the clutch slip is based on a wheel speed differential between the primary and secondary axles.

14. The all-wheel-drive vehicle of claim 10, wherein the clutch is mounted on the secondary axle.

15. The all-wheel-drive vehicle of claim 10, wherein the powerplant is an engine.

16. A method of detecting mechanical faults in an all-wheel-drive system, the method comprising:
engaging a clutch of an all-wheel-drive system to power primary and secondary axles of a vehicle; and
in response to occurrence of a predetermined number of instances of a powertrain power being less than a value, disengaging the clutch to disable all-wheel drive and propel the vehicle solely with the primary drive axle.

17. The method of claim 16, wherein the value is based on capacity of the clutch and slip of the clutch.

18. The method of claim 16, wherein the value is a product of capacity of the clutch and slip of the clutch.

19. The method of claim 17, wherein the powertrain power is based on a product of vehicle speed and engine torque, and the clutch slip is based on a wheel speed differential between the primary and secondary axles.

20. The method of claim 17 further comprising:
determining the powertrain power by multiplying engine torque by vehicle speed; and
determining the slip of the clutch by subtracting an average wheel speed of the secondary axle from an average wheel speed of the primary axle.

* * * * *